Feb. 1, 1955 — H. G. MARTIN — 2,700,775
COMBUSTION SANITATION SYSTEM
Filed May 4, 1951 — 4 Sheets-Sheet 1

INVENTOR
HORACE G. MARTIN
ATTORNEY

Feb. 1, 1955

H. G. MARTIN 2,700,775

COMBUSTION SANITATION SYSTEM

Filed May 4, 1951

INVENTOR
HORACE G. MARTIN
BY
ATTORNEY

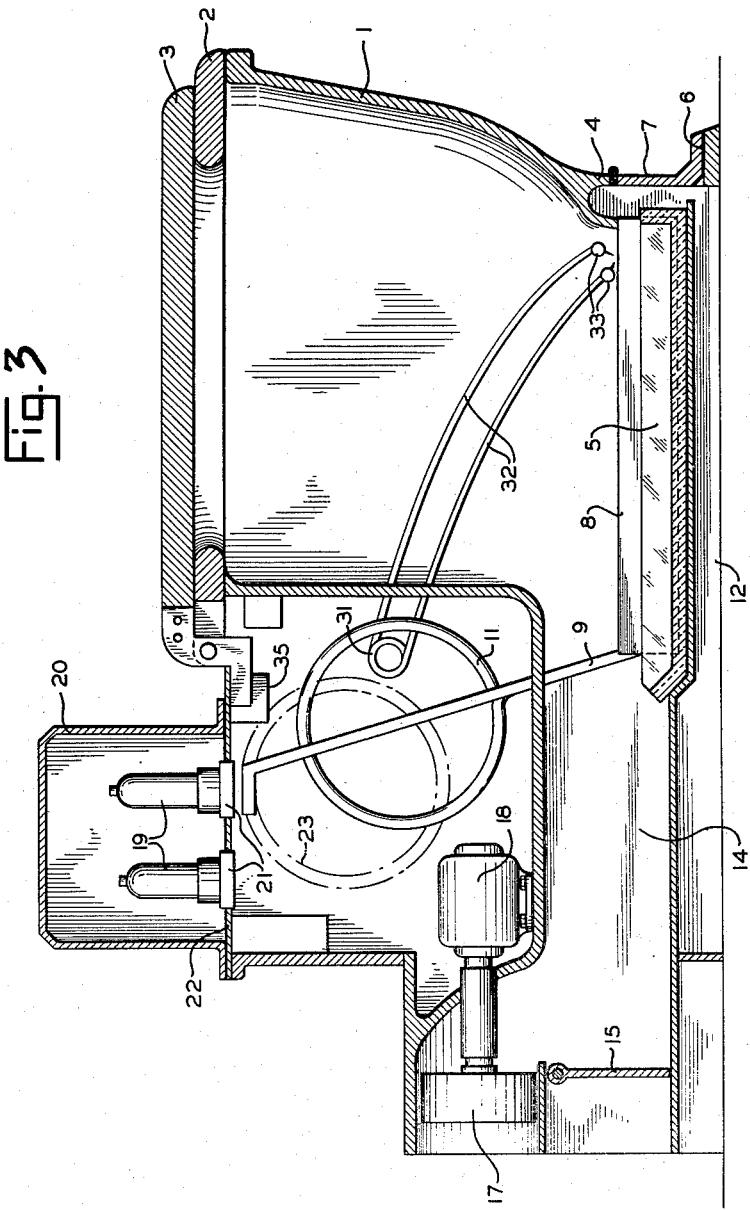

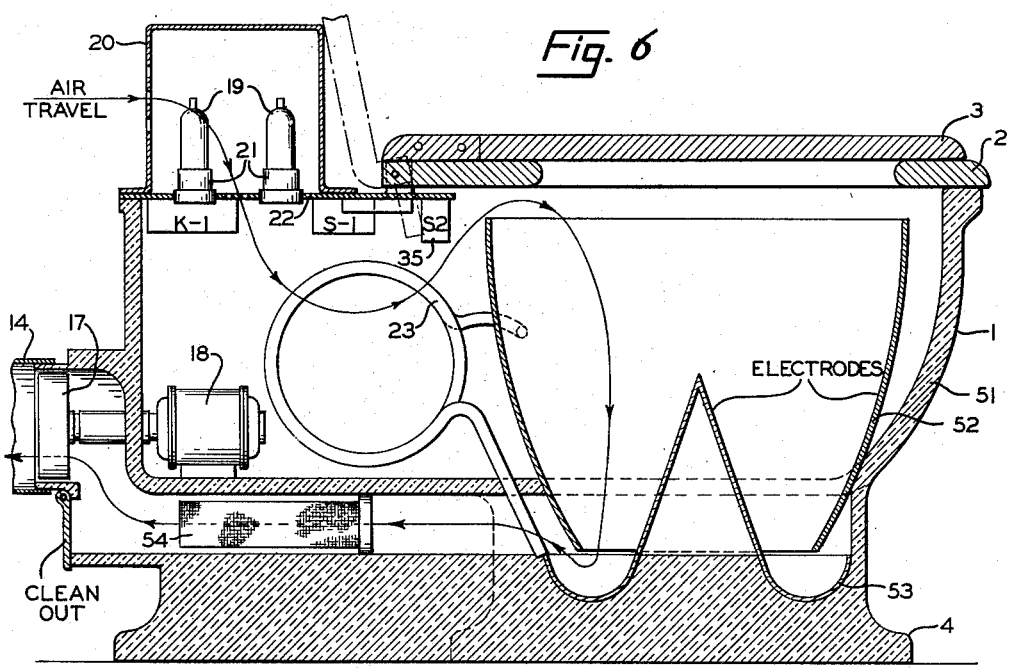
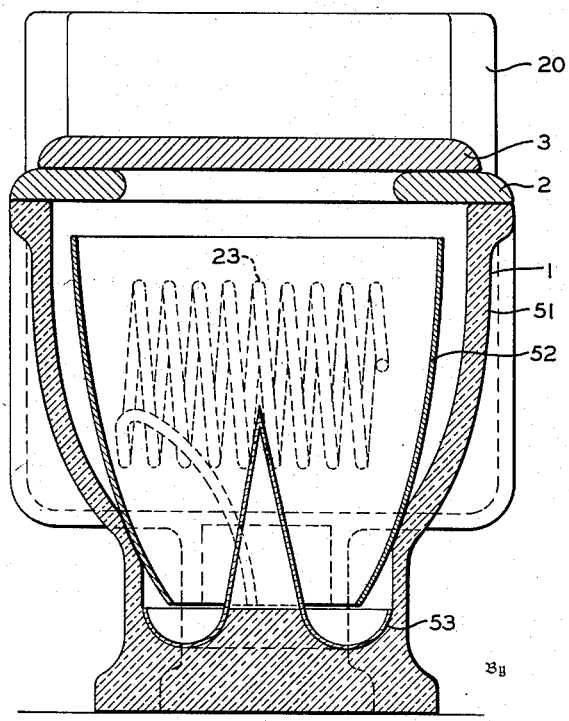

2,700,775

COMBUSTION SANITATION SYSTEM

Horace G. Martin, Brooklyn, N. Y.

Application May 4, 1951, Serial No. 224,474

4 Claims. (Cl. 4—131)

This invention relates to sanitary systems, relates particularly to incinerating means and devices for sanitary waste or sewage, and relates especially to means for the simultaneous incineration and deodorization of sanitary waste by high oscillatory frequency electrical energy, which simultaneously produces sufficient ozone to oxidize all odoriferous gases, all within the confines of a toilet bowl.

One of the most troublesome problems of modern civilization is the disposal of sanitary wastes. In the past, elaborate conduit sewage systems have been devised and operated, some discharging the waste material into rivers, and others into septic tanks or other destructive devices, but all of these systems require large quantities of water to convey and inactivate the waste and yield in effect a single system of water-borne sanitation, which is bulky, complicated, and expensive. Also, many attempts have been made at incineration of such sanitary wastes but the resulting apparatus has been unduly heavy, bulky, expensive, and, in particular, has tended towards the production of malodorous gases.

The present invention provides a simple sanitation system in which the waste material, without added carrying water, is incinerated within a closed toilet bowl by heat projected into the waste material by the use of oscillatory electrical energy, without the direct contact of heating means or flame; and any malodorous compositions or substances produced are simultaneously destroyed by ozone or other reaction materials generated simultaneously by the action of the same oscillatory frequency energy within the same toilet bowl. The device of the present invention is adapted to use as a single, self-contained unit in which the very small amount of ash produced is removed at infrequent intervals, and no malodorous products are obtained but only complete combustion of the material to the ultimate combustion products, mostly carbon dioxide and water, the combustion being produced by atmospheric oxidation in the presence of the radio frequency energy projected into the waste material by suitable electrodes.

Thus the invention simultaneously incinerates both solid and liquid wastes and simultaneously destroys incomplete combustion products by the use of radio frequency energy applied to the waste material and the partial combustion products through suitable electrodes all within the same toilet bowl. Other objects and details of the invention will be apparent from the following description when read in connection with the accompanying drawings, in which Figure 1 is a perspective view of a sanitation system according to the present invention;

Figure 3 is a side view in vertical section showing the arrangement of electrical circuits, electrodes, and air ducts;

Figure 6 is a view in longitudinal section of an alternative embodiment; and

Figure 7 is a view in transverse section of the embodiment of Figure 6.

Figure 1:
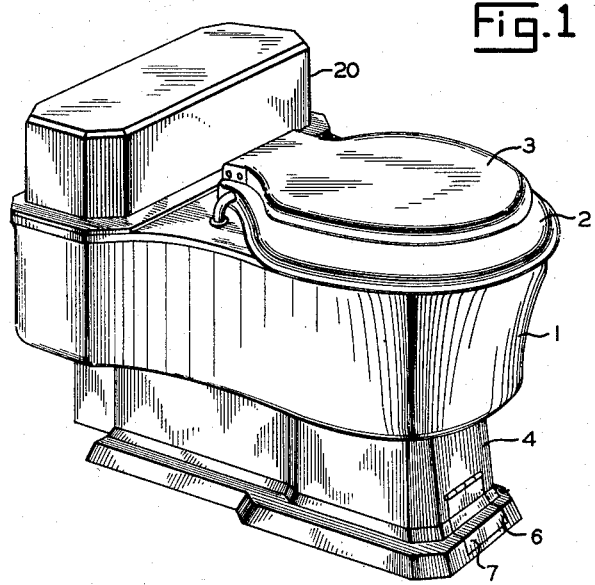
Figure 4:
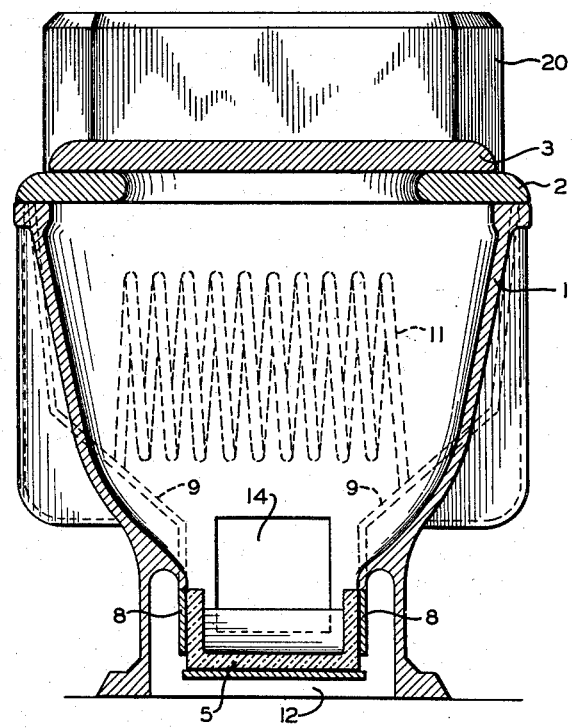
Figure 4 is a front view, partly in section, showing the electrodes and electric circuit members.

Referring to the drawings, the invention consists of a toilet fixture proper consisting of a bowl portion 1 having thereon a seat portion 2, and a cover 3. The main fixture including the bowl portion 1 and the base portion 4 is preferably made of hard burned porcelain, although alternatively it may be made of molded composition such as phenol-formaldehyde polymer resin or other of the well-known synthetic resins, or it may be made of metal with an appropriate surface treatment such as vitreous enamel or stainless steel, or chrome plate, or other analogous finish.

Inside of the base 4, there is positioned a tray member 5. This tray member 5 may, if desired, be made a permanent fixture, since the amount of ash produced from the incineration of ordinary sanitary waste is extremely small and the ash may be allowed to accumulate until a considerable quantity is present, whereupon it may be removed in any convenient way as by a small scoop, or by a vacuum cleaner, or other convenient means. Usually, however, there is the possibility that other things than sanitary waste will be deposited in the tray 5, and, while such materials can usually be incinerated by the radio frequency energy, they may, on occasion, yield substantial amounts of solid residue, and accordingly it is usually desirable that the tray member 5 be made removable through an opening 6 closed by a door 7 in the main frame to permit of a convenient removal and dumping of the ash residue. Adjacent the tray 5 there are positioned a plurality of electrodes 8 connected by leads 9 to a high frequency inductor coil 11. The electrodes 8 may consist of a single pair, positioned outside of the tray member 5 such that the heating is entirely inductive, in which case the tray 5 necessarily is made of insulating material which preferably is porcelain, but, alternatively, a plurality of pairs of electrodes may be positioned inside of the tray member 5 such that the heating obtained is both inductive and conductive. An air inlet flue 12 is provided conveniently extending under the pan member 5 to the front end of the pan and then rearwardly to deliver a current of air over the surface of the pan. An exit flue 14 is likewise provided, and equipped with a control damper 15. A suction fan 17 driven by a motor 18 is also desirably provided, the damper 15 being adjusted according to the character of outlet flue or chimney to which the device is connected.

Figure 5:
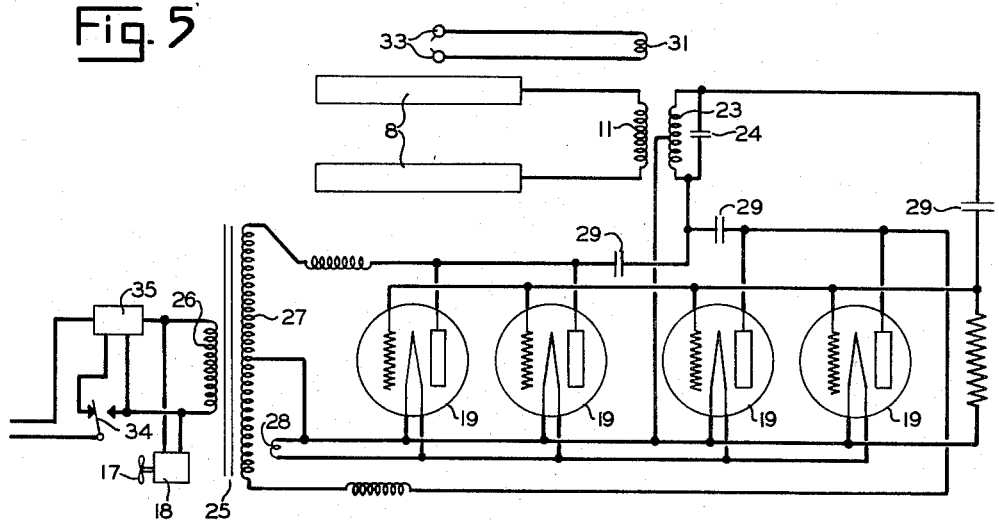
Figure 5 is a circuit diagram of the electrical power members.
Figure 2:
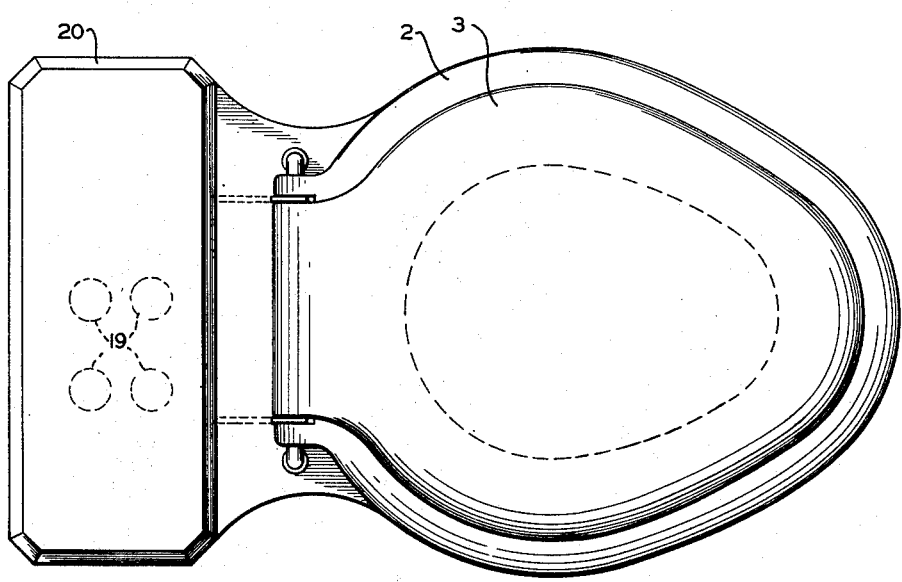
Figure 2 is a plan view of the device of the invention showing the electrical features.

There is also provided a high frequency oscillator which is positioned behind the seat member 2 under a cover 20. The oscillator may consist of a plurality of vacuum tubes 19 mounted in sockets 21 which are supported in a plate member 22. There is provided an oscillatory circuit consisting of a coil 23, as shown in Figure 3, which is inductively coupled with the coil 11. The coil 23 is connected to a condenser 24, as is particularly well shown in Figure 5. There is also provided an input transformer 25 having an input winding 26 suitable for connection to the available alternating current power circuit. The secondary coil 27 then provides plate current for the vacuum tubes 19 and a small secondary coil 28 provides power for the filaments of the vacuum tubes 19. It will be noted that the circuit shown is the well-known "back to back" self-rectifying oscillator circuit in which alternate tubes are active on alternate half cycles of the input power. The plate voltage of the respective tubes is isolated by appropriate condensers 29 to make sure that only radio frequency currents flow in the coil 23 and condenser 24. The usual filter chokes, grid resistors, and the like which are required by customary radio frequency practice are also provided as shown.

There may, if desired, also be provided a second coupled coil 31 (and condenser, if desired, to produce a resonant circuit for maximum voltage), having leads 32 connected to comb point electrodes 33 which may conveniently be positioned near the discharge end of the air intake duct 12, to provide a large supply of ozone.

The cover member 3 has attached thereto a switch member 34 which closes the power supply circuit to the transformer 25 when the cover 3 is closed, and there is also provided a time control switch 35 arranged to be actuated when the lead is closed and to open the circuit after a definite time of operation when the necessary incineration has been accomplished.

This device may consist of a synchronous clock with contacts which are opened after a definite time and remain open until an auxiliary voltage is applied by opening the cover 3.

In the operation of the device, the cover 3 is opened, closing the auxiliary contact in the switch 34 and releasing the contacts in the time control switch 35. The sanitary waste is then deposited into the tray 5 in the usual manner, whereafter the cover 3 is closed, closing the switch 34 against the main contact and energizing the transformer 25. This procedure heats the filaments of the tubes 19 and the tubes generate oscillations in the circuit containing the coil 23 and condenser 24 in the usual manner. The resulting oscillatory energy is transferred from the coil 23 to the coil 11, as is well shown in Figure 3, and from the coil 11 via the leads 9 to the electrodes 8. The presence of high frequency voltage on the electrodes 8 yields a powerful, high-frequency, electrostatic field within the tray member 5 which, by reaction with the sanitary waste deposited therein, develops a very large amount of heat directly in the material yielding a powerful and rapid incineration of the combustible material which is aided and speeded up very substantially by the presence of ozone produced by the application of an auxiliary portion of high-frequency electrical energy to the point electrodes 33. The ozone deodorizes incineration odors and at the same time facilitates the combustion of the solid matter.

It will be noted that the entire operation takes place within the closet bowl, including the initial desiccation, simultaneous oxidation of vaporized material by ozone to odorless residues, and then incineration of the desiccated residue, with simultaneous combustion of carbonaceous material, and oxidation by ozone of all breakdown materials and any products from destructive distillation by heat.

The steady current of air produced by the fan 17 and the motor 18 which are energized through the switch 34 draws a steady current of air past the electrodes 33 and then over the waste material resulting in rapid, effective, and odorless combustion of all of the solid carbonaceous material and simultaneously the evaporation and de-odorization of all liquid products, there remaining only a small amount of ash residue usually less than 0.2 to 0.5 per cent by weight of the original sanitary waste. It may be noted that this procedure will result in the combustion of any oxidizable material present in the tray 5 without regard to its character or source including cellulosic material of any sort and organic material in general, and any inorganic material is largely oxidized and converted to ash, even including small amounts of metal.

It may be noted that the preferred embodiment positions the electrodes 8 outside of the tray 5, and for most purposes this is satisfactory and effective. Occasionally, however, when large quantities of material must be incinerated at frequent intervals, it is advantageous to position additional electrodes inside of the tray 5 in order to concentrate the electrostatic field and obtain a more powerful heating and incinerating action. In the latter instance also, the electrodes may be provided with point portions serving to produce the desired ozone without the use of an auxiliary coil 31 and the electrodes 33. In some instances also, point electrodes may be provided on the plate electrodes 8 to produce the desired ozone for complete oxidation, incineration, and combustion.

It may be noted that eventually sufficient ash will accumulate in the tray 5 to reduce the efficiency of operation. When this stage is reached, the door member 7 is removed from the front and the tray 5 withdrawn through the hole 6 and dumped. When this operation is performed, it is usually advantageous to open the cover 3 briefly and then close it to apply incinerating heat to the ash material to make sure that it is completely dehydrated, incinerated, odorless, and unobjectionable.

An alternative embodiment of the invention is shown in Figures 6 and 7. In this embodiment there is provided a non-conducting bowl proper 51 of porcelain or molded resin or the like, within which there is positioned a metallic liner 52 which is connected to one side of the resonant circuit 23. This liner is generally tubular in form with an open bottom. At the lower end of the liner 52 there is provided a receptacle member 53, which is roughly the shape of a sombrero, with a center cone extending upwardly within the liner 52 and a bottom portion forming an annular trough to receive the sanitary waste. The receptacle member 53 is connected to the other terminal of the resonant circuit 23.

The lower edge of the liner 52 may be serrated, or equipped with sharp points, to increase the generation of ozone, as desired, and the annular trough of the member 53 is made of a size such that all portions are approximately equal distances from the lower edge of the liner 52, thereby establishing a nearly uniform oscillatory high-frequency electric field in the entire volume of the annular trough to give as uniform an incineration in the trough as possible.

In this embodiment, the removable ash receiver is replaced by a vacuum cleaner type of receptacle in the form of a bag 54, into which the ash is drawn by the air current produced by the fan 17. This air current may be drawn first over the vacuum tubes, then through the bowl and liner, then through the annular incinerator trough, and the filter bag, and discharged to a flue.

The preferred embodiment discharges the combustion to a flue, and the open air. This, however, is not necessary, since the circulating air may, if desired, be discharged into the room. Incineration and deodorization are both so complete that no objectionable odors remain, and the residual ozone masks such small amounts of odors as may escape.

This invention is a continuation-in-part of my prior-filed applications Serial No. 586,313, filed April 3, 1945, and Serial No. 725,809, filed February 1, 1947, now both abandoned.

Thus, the structure of the invention provides an incinerating toilet which requires no water for conveyance of sanitary waste; but instead incinerates the waste and at the same time deodorizes the waste products by the simultaneous application of radio frequency incinerating energy and ozone to the sanitary waste all within the bowl itself of the incinerator.

While there are above disclosed but a limited number of embodiments of the invention it is possible to provide still other embodiments without departing from the inventive concept herein disclosed, and it is therefore desired that only such limitations be imposed upon the appended claims as are stated therein or required by the prior art.

The invention claimed is:

1. An incinerating system comprising a receiver member having a center cone and an annular trough therearound composed of metal and an adjacent metallic cylinder about said cone, a radio frequency generator for producing high-frequency oscillatory energy, the said cone and cylinder serving as electrodes associated with said generator and with said receiver for the application of incinerating radio frequency energy to waste in said receiver, and means comprising an electrically charged point for the simultaneous development of ozone adjacent to said waste to destroy combustion odors all within said receiver and cylinder while burning said waste to ash.

2. In an incinerating toilet device, a nonconducting case member, a metallic electrode liner therein, a receiver tray in the form of a central cone and surrounding annular trough both within said case, and an electrical high-frequency oscillation generator having a resonant circuit and at least one oscillation generating vacuum tube, terminals of said resonant circuit being connected to said tray and said liner.

3. In an incinerating toilet device, a nonconducting case member, a metallic electrode liner therein, a receiver tray in the form of a central cone and surrounding annular trough both within said case, an electrical high-frequency oscillation generator having a resonant circuit and at least one oscillation generating vacuum tube, terminals of said resonant circuit being connected to said tray and said liner, a fan, and an air duct passing over said vacuum tube and through said liner and said annular trough to said fan.

4. In an incinerating toilet device, a nonconducting case member, a metallic electrode liner therein, a receiver tray in the form of a central cone and surrounding annular trough both within said case, an electrical high-frequency oscillation generator having a resonant circuit and at least one oscillation generating vacuum tube, terminals of said resonant circuit being connected to said tray and said liner, a fan, an air duct passing over said vacuum tube and through said liner and said annular trough to said fan, and an ash collector positioned in said duct between said trough and said fan.

References Cited in the file of this patent

UNITED STATES PATENTS

| | | |
|---|---|---|
| 1,272,483 | McGary et al. | July 16, 1918 |
| 1,293,141 | McGary | Feb. 4, 1919 |
| 2,000,684 | Allen et al. | May 7, 1935 |
| 2,279,361 | Omstuz | Apr. 14, 1942 |
| 2,279,577 | Martin | Apr. 14, 1942 |
| 2,279,578 | Martin | Apr. 14, 1942 |
| 2,325,652 | Bierwirth | Aug. 3, 1943 |
| 2,327,457 | Raisch | Aug. 24, 1943 |
| 2,353,362 | Rudd | July 11, 1944 |
| 2,442,114 | Brown | May 25, 1948 |
| 2,489,135 | Himmel et al. | Nov. 22, 1949 |